Aug. 5, 1952   R. GRAY   2,605,529
FID HOOK WITH SAFETY LATCH
Filed March 2, 1951
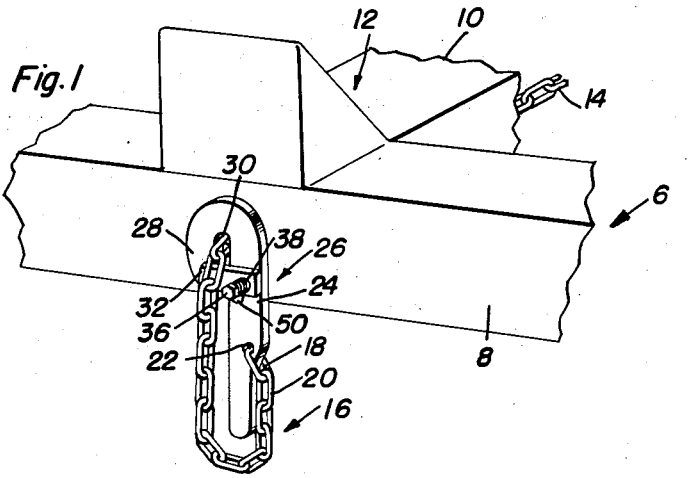
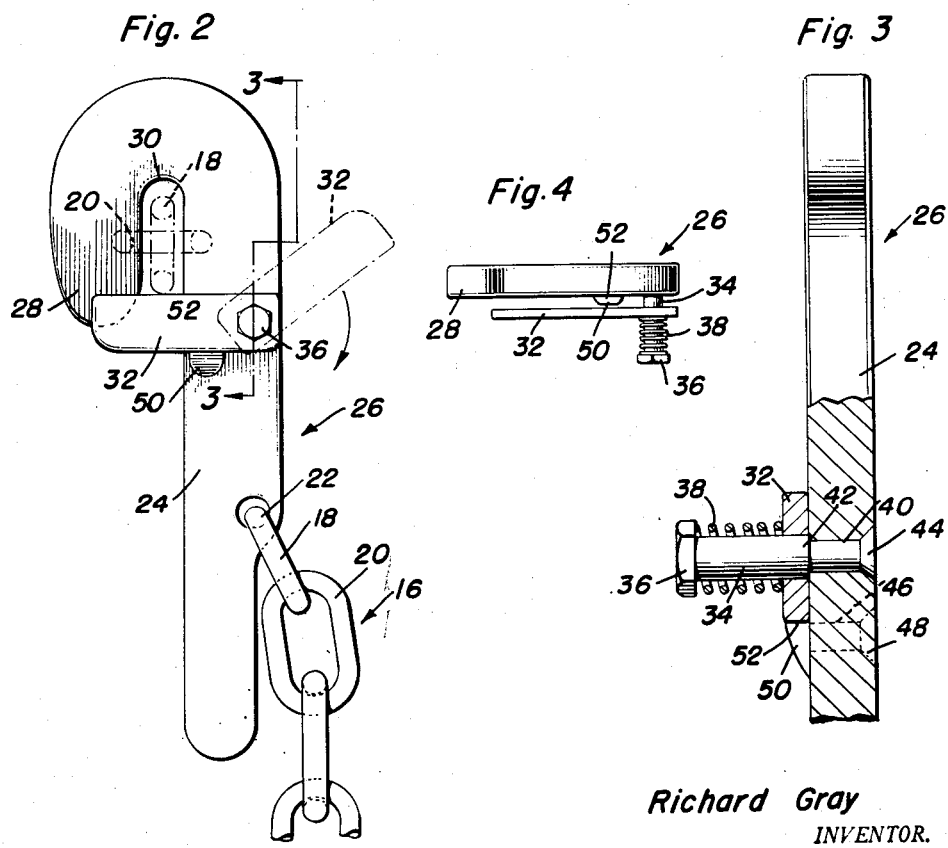
Richard Gray
INVENTOR.
BY Clarence A. O'Brien
and Harvey B. Jackson
Attorneys Patented Aug. 5, 1952

2,605,529

UNITED STATES PATENT OFFICE 2,605,529

FID HOOK WITH SAFETY LATCH

Richard Gray, Bieber, Calif.

Application March 2, 1951, Serial No. 213,637

1 Claim. (Cl. 24—235)

The present invention relates to certain new and useful improvements in a so-called fid hook and has more particular reference to a safety latch which is carried by and forms a part of the hook and definitely functions to prevent said hook from accidentally disengaging itself from the end portion of the locking chain to which it is positively connected.

It is a matter of common knowledge that a conventional heavy duty fid hook is one which is characterized by a shank having a rounded bill or beak portion at one end. Since these hooks are used in the logging industry they are permanently attached to an end portion of a locking chain. Usually, logs are transported on a conveyance having what is called a bunk and the logs are held in assembled relationship through the aid of bolster means having adjustable chocks or blocks at opposite ends of the bolster means. The chocks are retained in established or log holding positions by what are called locking chains. The free ends of the chains are provided with the aforementioned fid hooks. The trouble has been that fid hooks sometimes accidentally release themselves from the desired locked position on the coacting chain with the result that the adjacent chock is also displaced and injuries to life and limb frequently result.

The obvious purpose of the instant invention is to utilize a fid hook which has a safety feature; namely, a hook retaining latch. The latter takes the form of a simple pivoted latch element which has spring means associated therewith in order that it may be opened for purposes of releasing the hook from the chain with requisite ease.

Briefly summarized, the over-all construction comprises a conventional type fid hook which is attached to one end of the stated locking chain, a simple latch bar which is pivotally mounted on the shank, which is thrust into position by a coil spring, said latch bar spanning the mouth between the bill and shank of the hook to retain the chain in the crotch of the hook. A shoulder forming stop lug is also provided to limit the swinging movement of the safety latch in one direction.

Other objects and advantages will become more readily apparent from the following description and the accompanying sheet of illustrative drawings.

In the accompanying sheet of drawings wherein like numerals are employed to designate like parts throughout the views:

Fig. 1 is a fragmentary perspective view showing a portion of a log bunking truck or the like, bolster, chock, locking chain and improved safety type fid hook constructed and used in accordance with the present invention;

Fig. 2 is an elevational view of the fid hook;

Fig. 3 is an exaggerated view taken on the irregular vertical line 3—3 of Fig. 2 looking in the direction of the arrows; and, Fig. 4 is a top or edge view of the construction shown in Fig. 2.

Persons skilled in the art to which the invention relates are aware that locking chains for log holding chocks are sturdy and that fid hooks used in association therewith are quite heavy and obviously in the heavy duty class. Taking into consideration mud accumulation, ice and snow and other difficulties, it is common knowledge that these fid hooks are subjected to rough usage in handling. As a matter of fact, it is generally necessary to vigorously bang a fid hook loose from the chain through the use of a sledge hammer. For this reason the safety latch feature has to be rugged and substantially foul-proof.

Reference being had to Fig. 1, the numeral 6 designates a suitable truck, conveyance or the like, the platform or bed which is often referred to in the logging industry as a log bunk. It includes a suitable frame structure 8 and cross members or bolsters 10. At the opposite ends of the transverse bolsters are appropriate long retaining slidably mounted chocks or blocks 12. These are used in pairs (not shown). It will be understood in this connection that the present invention has nothing to do with the particular construction of a truck or bunk and, as a matter of fact, it is used in connection with the usual locking chain 14 which is made up of rugged interconnected chain links 18 and 20. One end link of the chain is suitably connected as at 22 with the straight rigid shank 24 of the improved fid hook 26. The hook also embodies a hooked bill or beak 28 having a rounded tip, said hook defining a crotch 30 for the chain links in the manner shown in dotted lines in Fig. 2. The latch comprises a rigid bar member 32 which is adapted to bridge the mouth or throat of the hook in the manner shown in the drawings. In Fig. 2 the latch is shown in safety locking position in full lines and in open position in dotted lines. It is hingedly mounted on an adapter stud 34 in the manner shown. The stud is cylindrical and provides a satisfactory mounting and pivot for the latch and the stud is also provided with a head 36 and accommodates a coil spring 38 which bears against the head, surrounds the stud and also bears against the latch bar 32 and presses the same "home" in the manner in the drawings in Figs. 1, 2 and 3. The latch is shown open in Fig. 4 under which circumstances the coil spring is, of course, compressed. In this particular figure the latch is merely shown partly open or about ready to be swung from the full line position shown in Fig. 2 to the dotted line position shown in the same figure, all of which will be clear by considering the views singly and collectively. Returning to the stud this has a reduced shank 40 providing a shoulder 42 which abuts the shank of the hook and said reduced shank 40 is hammered and flattened into a rivet-like retaining head 44. A similar rivet is shown at 46 and has a retaining head 48 and said rivet has in turn a suitable head 50 on its opposite end which has a flat faced edge portion 52. The head 50 provides a stop lug for limiting the downward swing of the latch in the drawings. When the lower edge of the latch bar rests on the ledge or shoulder 52 the latch is retained firmly in its safety latching position as is clear.

It will be understood that the coil spring 38 is sufficiently stout to provide the required stress against the latch so that the latter is reliably held in its retaining position. Nevertheless, it is possible to pry the latch to the spaced position shown in Fig. 4 to assist said latch to an open or non-latching position.

It is within the sphere of the invention to turn out or manufacture fid hooks with the latch and stop means herein shown. It is also within the purview of the invention to simply bore holes in the shank of conventional fid hooks and to supply the parts in the form of attachments and to thus transform a latchless hook into one with the safety latch feature embodied therein.

Minor changes in shape, size, materials and rearrangement of parts may be resorted to in actual practice so long as no departure is made from the invention as claimed.

Having described the invention, what is claimed as new is:

For use in connection with a chock adjusting and locking chain; a fid hook comprising a J-shaped member having a shank with a hook at one end of the shank, said hook having a bill portion terminating opposite an intermediate portion of said shank, said shank and hook having flat coplanar surfaces, a stop lug fixedly mounted on one flat face of said shank in a position beyond said bill portion, a headed stud also mounted on said one flat face in close proximity to said lug and occupying a position opposite the terminal end of said bill portion, a latch bar being of general rectangular form in plan, one end of said bar being hingedly mounted on said stud, said bar resting against cooperating portions of said flat surfaces and bridging the crotch forming space between said shank and bill portion at right angles to the latter and having an edge bearing against said lug, and a coil spring surrounding and retained on said stud and having yielding pressure contact with said latch bar, the latter being of a length less than the distance between the respective outer marginal edges of the shank and hook respectively.

RICHARD GRAY.

REFERENCES CITED

The following references are of record in the file of this patent:

UNITED STATES PATENTS

| Number | Name | Date |
|---|---|---|
| 292,476 | Ferris | Jan. 29, 1884 |
| 466,766 | Boiteau | Jan. 12, 1892 |
| 487,264 | Haas | Dec. 6, 1892 |
| 751,614 | Cotten | Feb. 9, 1904 |
| 1,254,386 | Anderson | Jan. 22, 1918 |
| 1,411,403 | Cadman | Apr. 4, 1922 |
| 1,517,019 | Serl | Nov. 25, 1924 |
| 1,570,865 | Soucy | June 26, 1926 |
| 1,668,325 | Kreutz | May 1, 1928 |
| 1,842,593 | Edwards | Jan. 26, 1932 |
| 2,197,881 | Seabo et al. | Apr. 23, 1940 |

FOREIGN PATENTS

| Number | Country | Date |
|---|---|---|
| 43,066 | France | Nov. 23, 1933 |